Dec. 28, 1954    S. C. COLLINS    2,698,211
PACKED PISTON
Filed June 2, 1952

INVENTOR:
SAMUEL C. COLLINS
BY
ATTORNEY

United States Patent Office 2,698,211
Patented Dec. 28, 1954

2,698,211

PACKED PISTON

Samuel C. Collins, Watertown, Mass., assignor to Joy Manufacturing Company, Pittsburgh, Pa., a corporation of Pennsylvania Application June 2, 1952, Serial No. 291,083

5 Claims. (Cl. 309—23)

This invention relates to a packed piston for a cylinder-and-piston mechanism, especially to a carbon packed piston.

There are numerous industrial applications in which compressors are necessary, and in which it is highly desirable that the compressors be operated without using the conventional hydrocarbon type of lubricants. In order to get away from the use of such lubricants, many attempts have been made to provide non-metallic packing for the pistons of piston-and-cylinder mechanisms adapted, for example, to compress air for oxygen generators of the type disclosed in Win W. Paget's Patent No. 2,588,656, March 11, 1952. Such attempts have been largely unsuccessful, owing probably to the highly frangible quality of carbon piston rings.

It is an object of this invention to provide a carbon packed piston for a cylinder-and-piston mechanism, in which the highly frangible carbon packing is designed to be subject to a minimum of distortion in use, and which is made in blocks designed to provide a minimum of stress concentrations. This and other objects are accomplished in a piston provided with packing or "rings," the packing consisting of highly frangible non-metallic material such as carbon, and being formed in blocks adapted to be biased by suitable resilient means outward into contact with the cylinder wall.

In the drawings:

Fig. 8 could also be a plan view of the non-metallic disc disposed immediately above the metallic disc, the non-metallic disc being slightly larger in diameter than the metallic disc in order to contact the cylinder wall.

Figure 1:
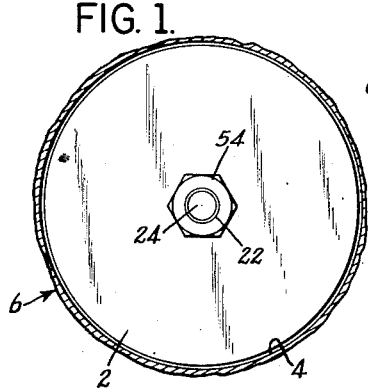
Fig. 1 is a top plan view of a packed piston made according to the invention, this view being a partial section through the cylinder block.

A packed piston made according to this invention may be used in many of a large number of cylinder-and-piston mechanisms, and accordingly only a small portion of such a mechanism is shown in the drawings. As there shown, a piston indicated generally at 2 is shown disposed in the cylinder 4 of a cylinder block indicated generally at 6.

The piston itself is composed of a plurality of discs and members suitably held together to form a piston generally known as of the trunk type. More specifically, a metallic disc 8 is shown at the very top of piston 2, disc 8 having in one side thereof a groove 10. A non-metallic member indicated generally at 12 is shown as comprising two block portions 12a and 12b relatively movable along a diameter 14. Each of the blocks 12a and 12b is recessed as shown at 16, each block being preferably provided with such a recess at opposite sides of the diameter 14. Resilient means are provided to expand the two portions 12a and 12b outward into contact with the cylinder wall, these resilient means preferably taking the form of coil springs 18 disposed in the recesses 16.

The non-metallic member 12 is preferably made of a highly frangible substance such as carbon, and is of course adapted to have a sliding fit in the groove 10 of the metallic disc 8. Disc 8 is provided with a central opening 20 to receive the threaded portion 22 of a piston rod 24. Non-metallic member 12 is centrally bored or recessed as shown at 26. It will of course be understood by those skilled in the art that, when the non-metallic member 12 is new, the two substantially plane surfaces 28 and 30 are closely adjacent each other, possibly even in actual contact, in which case the two recessed portions 26 cooperate to form a substantially circular opening to receive the reduced diameter portion 32 of the piston rod 24.

The threaded portion 22 of the piston rod 24 is preferably the smallest part of the piston rod, forming a shoulder at 34 with the portion 32, and the portion 32 is preferably smaller than the major part of the rod 24 forming therewith a shoulder 36.

A second non-metallic member is indicated generally at 38, and comprises two portions 38a and 38b. The two portions 38a and 38b are relatively movable along a diameter 40, and are recessed at opposite sides of the diameter and provided with resilient means 42 in much the same manner as the non-metallic member 12. The non-metallic member 38 is of course also recessed as indicated at 44 in order to provide, when the member is new, a substantially central opening to receive the reduced diameter portion 32 of the piston rod.

It will of course be understood by those skilled in the art that, in order to provide a maximum seal against blowby, the second non-metallic member 38 will preferably be oriented on the piston rod with its diameter 40 of outward expansion disposed substantially at right angles to the diameter 14 of outward expansion of the member 12.

Figure 2:
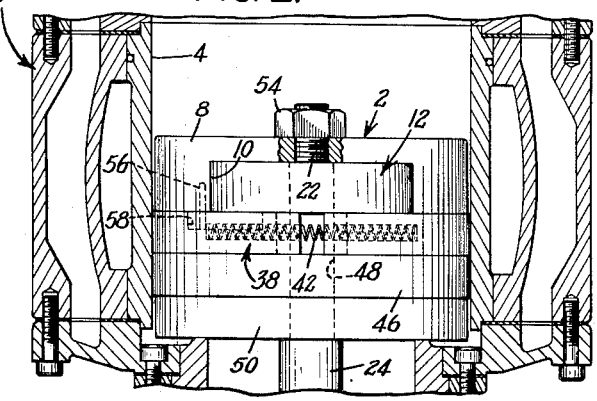
Fig. 2 is a longitudinal section through a portion of a cylinder of a cylinder-and-piston mechanism made according to this invention, showing the piston largely in elevation but partially broken away and in section to show details.
Figure 3:
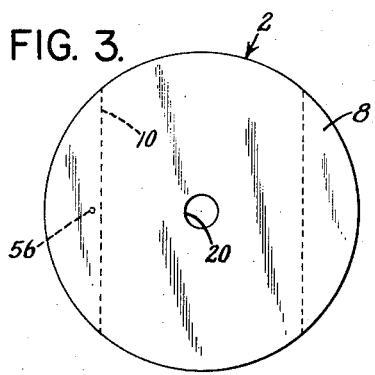
Fig. 3 is a top plan view of the uppermost metallic disc shown in Fig. 2.
Figure 4:
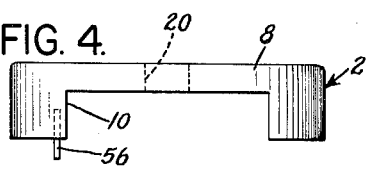
Fig. 4 is a side elevation of the disc shown in Fig. 3.
Figure 5:
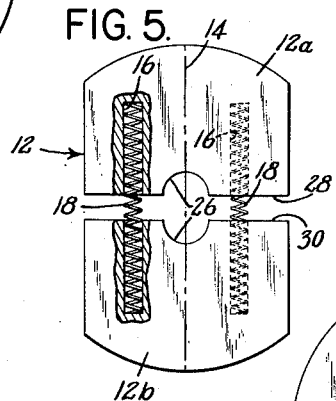
Fig. 5 is a top plan view, partially broken away and in section, of the uppermost non-metallic packing member shown in Fig. 2.
Figure 6:
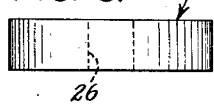
Fig. 6 is an end elevation of the packing member shown in Fig. 5.
Figure 8:
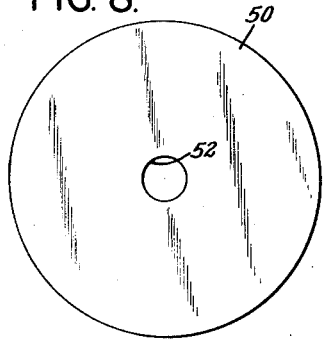
Fig. 8 is a top plan view of the lowermost piston member, this member being a metallic disc.
Figure 9:
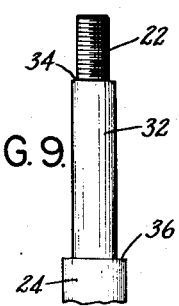
Fig. 9 is a view in elevation of the upper end of the piston rod.
Figure 7:
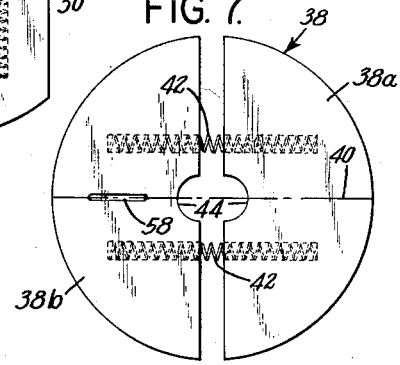
Fig. 7 is a top plan view of the second non-metallic packing member.

As can best be seen from Fig. 2, the second non-metallic member 38 has an upper surface adjacent the first non-metallic member 12 and also adjacent the grooved side of the metallic disc 8. A non-metallic disc 46 is disposed below the second non-metallic member 38 adjacent the remaining surface of member 38. The disc 46 is also preferably of a highly frangible substance such as carbon, being in this respect similar to the members 12 and 38. However, the disc 46 is a simple solid disc provided with a central opening 48 to receive the reduced diameter portion 32 of the piston rod.

The lowermost piece forming the piston consists simply of a metallic disc 50, disc 50 being a simple disc having a substantially central opening 52 to receive the reduced diameter portion 32 of the piston rod. As is best seen in Fig. 2, discs 8 and 50 are both made slightly smaller than the cylinder to permit unequal expansion without danger of rubbing contact between the discs 8 and 50 and the cylinder wall. The non-metallic disc 46, on the other hand, is provided with no such clearance, and preferably engages at its cylindrical peripheral surface the cylinder wall, at least when the disc 46 is new.

Means are provided to hold the several discs and members in assembled relation, these means comprising the aforesaid shoulder 36 and a nut 54 adapted to cooperate with the threaded portion 22 of the piston rod. The metallic disc 2 is preferably clamped between the shoulder 34 and the nut 54, and the proportions of the several discs and members are such that the non-metallic members 12 and 38 are not tightly clamped, but have a sliding fit with those pieces of the piston adjacent them in order to permit free outward expansion against the cylinder wall under the influence of their resilient means 18 and 42 as wear takes place. It will of course be understood by those skilled in the art that the faces of members 12 and 38 are initially formed to have the contour of the cylinder wall with which they cooperate.

Mention was made above of the preferred orientation of diameter 40 substantially at right angles to diameter 14. In many cases a simple assembly of the various pieces with such an orientation will suffice. In some cases, however, it will be further desirable to provide positive means to constrain the second non-metallic member 38 in the stated orientation—namely to prevent shifting of the diameter 40 until it lies in a vertical plane with diameter 14. Such means are provided in a pin-and-slot device associated with the second non-metallic member and the first-named metallic disc. As here shown, a pin 56 is preferably provided on the disc 8 to protrude from the lower surface, or the side in which the groove 10 is provided, and closely adjacent the groove 10. Pin 56 is adapted to project into and cooperate with a slot 58 provided in the upper surface of the non-metallic member 38.

Operation

In operation, a packed piston made according to this invention can be used without any of the conventional hydrocarbon lubricants. The highly frangible non-metallic packing members 12 and 38, being preferably of carbon, are expanded radially outward against the cylinder wall under the influence of their resilient means 18 and 42. As the members 12 and 38 wear, their resilient members move them outward to keep them in contact with the cylinder wall, effecting a substantially gas tight seal.

In many applications, the simple assembly of the members 12 and 38 with their expansion axes or diameters 14 and 40 substantially at right angles will suffice to provide the desired gas tight seal. In some applications, however, it will be further desirable to provide the pin-and-slot mechanism disclosed, and this mechanism will of course constrain the non-metallic member 38 in the desired orientation with respect to the non-metallic member 12.

It will be evident to those skilled in the art that I have here provided an improved type of packed piston having numerous advantages, one of which is its utility in an unlubricated cylinder-and-piston mechanism. Other advantages will be apparent to those skilled in the art.

While there is in this application specifically described one form which the invention may assume in practice, it will be understood that this form of the same is shown for purposes of illustration, and that the invention may be modified and embodied in various other forms without departing from its spirit or the scope of the appended claims.

I claim:

1. A packed piston for a cylinder-and-piston mechanism comprising: a metallic disc having a groove in one side thereof; a non-metallic member disposed in the groove and having faces adapted to engage the cylinder wall, said member comprising two portions similar in transverse section to the groove and relatively movable outward along a diameter, and resilient means engaging the two portions to expand the two portions outward into contact with the cylinder wall; a second non-metallic member having faces adapted to engage the cylinder wall and being adjacent the first-named non-metallic member and having two portions relatively movable along a second diameter, and resilient means engaging the two portions to expand the two portions outward along the second diameter; a non-metallic disc adjacent the second non-metallic member; a second metallic disc adjacent the non-metallic disc; and means to hold the discs and non-metallic members together to form a piston.

2. A packed piston for a cylinder-and-piston mechanism comprising: a metallic disc having a groove in one side thereof; a non-metallic member disposed in the groove and having faces adapted to engage the cylinder wall, said member comprising two portions relatively movable in the groove outward along a diameter, and resilient means engaging the two portions to expand the two portions outward into contact with the cylinder wall; a second non-metallic member having two surfaces one of which is adjacent the first-named non-metallic member and adjacent the grooved side of the metallic disc and having two portions relatively movable along a second diameter, and resilient means engaging the two portions to expand the two portions outward along the second diameter, the second non-metallic member being so oriented that the second diameter is disposed at substantially right angles to the first-named diameter; a non-metallic disc adjacent the second non-metallic member; a second metallic disc adjacent the non-metallic disc; and means to hold the discs and non-metallic members together to form a piston.

3. A packed piston as in claim 2 having a pin-and-slot device associated with the second non-metallic member and the first-named metallic disc.

4. A packed piston for a cylinder-and-piston mechanism comprising: a metallic disc having a groove in one side thereof; a non-metallic highly frangible member having faces adapted to engage the cylinder wall and disposed in the groove, said member comprising two portions relatively movable outward along a diameter, and resilient means engaging the two portions to expand the two portions outward into contact with the cylinder wall; a second non-metallic highly frangible member having faces adapted to engage the cylinder wall and being adjacent the first such member and having two portions relatively movable along a second diameter, and resilient means to expand the two portions outward along the second diameter, said second member being so oriented that the second diameter is disposed substantially at right angles to the first-named diameter; a non-metallic disc adjacent said second member; a second metallic disc adjacent the non-metallic disc; and means to hold the discs and members together to form a piston.

5. A packed piston as in claim 4 having means to constrain said second member in the stated orientation.

References Cited in the file of this patent

UNITED STATES PATENTS

| Number | Name | Date |
| --- | --- | --- |
| 451,850 | Blessing | May 5, 1891 |
| 1,898,845 | Meyer | Feb. 21, 1933 |
| 2,020,426 | Meyer | Nov. 12, 1935 |
| 2,092,087 | Saharoff | Sept. 7, 1937 |